(12) United States Patent
Sadovsky et al.

(10) Patent No.: US 8,214,343 B2
(45) Date of Patent: Jul. 3, 2012

(54) PURPOSING PERSISTENT DATA THROUGH HARDWARE METADATA TAGGING

(75) Inventors: Vladimir Sadovsky, Redmond, WA (US); Nathan Obr, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 12/050,952

(22) Filed: Mar. 19, 2008

(65) Prior Publication Data

US 2009/0240678 A1 Sep. 24, 2009

(51) Int. Cl.
*G06F 17/30* (2006.01)
*G06F 17/00* (2006.01)
(52) U.S. Cl. ........... 707/705; 711/207; 709/214; 710/33
(58) Field of Classification Search ........... 707/999.101, 707/999.102; 711/207, 216, 114, 161; 709/214; 710/33
See application file for complete search history.

(56) References Cited

U.S. PATENT DOCUMENTS

| | | | |
|---|---|---|---|
| 5,754,844 A | 5/1998 | Fuller | |
| 6,070,225 A | 5/2000 | Cheung et al. | |
| 6,446,183 B1 | 9/2002 | Challenger et al. | |
| 6,732,241 B2 * | 5/2004 | Riedel | 711/154 |
| 6,954,746 B1 * | 10/2005 | Batista | 706/45 |
| 7,236,992 B2 * | 6/2007 | Yano et al. | 1/1 |
| 7,392,291 B2 * | 6/2008 | Jewett et al. | 709/214 |
| 7,454,592 B1 * | 11/2008 | Shah et al. | 711/216 |
| 7,945,726 B2 * | 5/2011 | Faibish et al. | 711/112 |
| 2005/0216788 A1 | 9/2005 | Mani-Meitav et al. | |
| 2006/0053139 A1 | 3/2006 | Marzinski et al. | |
| 2006/0242379 A1 | 10/2006 | Korgaonkar et al. | |
| 2006/0248433 A1 | 11/2006 | Larsen et al. | |
| 2007/0005901 A1 | 1/2007 | Kellar | |
| 2007/0050548 A1 | 3/2007 | Bali et al. | |

OTHER PUBLICATIONS

"Wenguang's Introduction to Universal Disk Format (UDF)", retrieved on Sep. 21, 2007 at <<http://homepage.mac.com/wenguangwang/myhome/udf.html>>, pp. 1-15.
Fegreus, "Virtual Disk Block: San Roi Tipping Point", Apr. 19, 2006, pp. 1-10.
Zhang, "Simple, Effective and Reliable Tag Storage System Design", 2007, pp. 1-16.

* cited by examiner

*Primary Examiner* — Yicun Wu

(57) ABSTRACT

Storage devices can maintain metadata on a per-block basis, enabling the storage device, the file system, or other higher-level software to store and obtain information about individual blocks of data. A handshake between the storage device and a computing device can include an exchange of feature tables, whereby a commonly supported set of features and attributes can be selected and agreed upon. Such features and attributes can include access pattern specification in the per-block metadata, frequency of access or importance designations and specifications of the longevity of temporary data. The per-block metadata can either be provided by an application or the file system, or it can be generated by the storage device itself. Likewise, per-block metadata can be utilized by the storage device, either on its own or at the behest of an application or the file system, or it can be utilized directly by the application or file system.

21 Claims, 7 Drawing Sheets

PURPOSING PERSISTENT DATA THROUGH HARDWARE METADATA TAGGING

BACKGROUND

Metadata, or "data about data" has been used by modern computing devices in many contexts to provide a greater range of options and greater efficiency. For example, file properties, such as the date a file was created or last modified have been used to focus searches, make updating software easier, and provide the user with greater information regarding their files. Similarly, usage information can enable software utilities and operating systems to pre-cache various files in anticipation of their usage, thereby improving the overall user experience.

Traditional storage media store and access metadata in a sequential manner, much as they do any other data. Specifically, storage media based on magnetic or optical technology encodes metadata as a sequence of one or more bits in-line with other data, such as the file data itself. As a result, any metadata is in the same addressable namespace as the data itself. For example, metadata can be stored at a first address, and the data itself can be stored at a subsequent address. Thus, if a software program were to request only the metadata of a series of files, traditional storage media would still need to seek over all of the in-line data of the series of files to reach each of the requested metadata. Operating systems, or other software utilities can request the storage of file or folder metadata separately from the file or folder data itself, but this can increase the time required for the storage medium to acquire the data of the file once it is requested, such as based on information received from the metadata.

Modern storage media include, not only media that store data in a sequential manner, such as traditional magnetic and optical storage media, but also storage media, such as solid-state based storage media, that can store data in a random manner, such that any one bit of data is as efficiently accessed as any other bit of data. More specifically, magnetic and optical media require a reading and writing apparatus that physically moves from the physical location of one bit to the physical location of another bit. Consequently, the speed with which such storage media can read or write data is dependent upon the proximity of the locations of the data on the media, since the reading and writing apparatus must physically transition from one location to the other. Conversely, solid-state based storage media can read and write data though the direction of electrical signals to a uniquely specifiable location. Because the speed with which the electrical signals arrive at any particular location within the solid-state based storage media is approximately equivalent, data stored on such media can be written, or read, in approximately the same amount of time irrespective of the particular location of the data.

Modern storage devices include, in addition to the storage media itself, one or more capable controllers, which are designed to manage the data stored on the storage media. These controllers can perform management tasks that are internal to the storage device itself, such as, in the context of solid-state storage media, wear leveling or compaction.

SUMMARY

In one embodiment, the ability of modern storage devices to access any data as efficiently as any other data can be utilized to store per-block metadata such that each block of data, which need not correspond to a whole file, object, or other higher-level software division, can have associated with it one or more bits of metadata. For example, each four-kilobyte page of data could have associated with it, and stored with it, 32 bytes of metadata. Because the contemplated storage device can access any data as efficiently as any other data, the metadata need not be part of the same addressable namespace as the data itself. Instead, metadata stored at a first address in the metadata namespace can be associated with data stored at that same address, except within the data namespace. As a result, it is no longer necessary to seek to the location of the data to determine its associated data. Thus, a search, for example, could be preformed referencing only the 32 bytes of metadata instead of the associated four kilobytes of data, thereby substantially increasing searching speed. Additionally, the storage device itself can now know where the metadata is stored, as it is no longer interleaved with the data, enabling the storage device to use such metadata to hold hardware-specific or persistence-specific information.

In a further embodiment, a protocol can be established through which a storage device capable of supporting per-block metadata can negotiate with an operating system, or other higher-level software, to agree upon a set of per-block metadata features and attributes that can then be utilized by the operating system or other higher-level software. For example, both the storage device and the operating system, or other higher-level software, can communicate, to each other, a feature table comprising supported per-block metadata features and attributes. Subsequently, each can agree upon a set of features and attributes that are commonly supported, and the operating system, or other higher-level software, can then use the agreed upon per-block metadata features and attributes to tag specific blocks with per-block metadata attributes, or to provide information which the storage device can use to tag specific blocks with per-block metadata.

In a still further embodiment, per-block metadata can be provided by the operating system or other higher-level software for subsequent use by the operating system or higher-level software, or it can be provided by the operating system or higher-level software so that the storage device can use it on behalf of the operating system or higher-level software, or, alternatively, the per-block metadata can be used, and even generated by, the storage device itself. Per-block metadata can be used to define the boundaries of objects such that the operating system, other software utilities, or the storage device itself, can, based on the tagged boundaries, identify blocks that are likely to be subsequent requested since they are all part of a single object. Such information can then be used to pre-cache, or pre-load, such other blocks, rendering access to them more efficient. Per-block metadata can also be used to identify the frequency of access or the importance of one or more blocks, which can then be used by software utilities, the operating system or the storage device to, for example, compress unused blocks or move often used blocks into a high-speed storage area or cache, if available.

In a yet further embodiment, mechanisms can be provided by which the operating system, or higher-level software, can read or write metadata without actually having to read or write the data associated with such metadata. Thus, for example, while standard read and write commands can be used to provide, and obtain, both blocks of data and their associated metadata, the metadata can likewise be provided, or obtained, through out-of-band communications. Consequently, if the storage device could itself perform a metadata-centric action, such as with respect to metadata provided by and used by the storage device itself, then mechanisms can be provided whereby the operating system, or other higher-level software, could likewise perform or request the hardware to perform on its behalf such metadata-centric actions. Simultaneously, the mechanisms provided can be compatible with software, such as legacy software, that is not capable of accessing or utilizing per-block metadata. For example, the accessing of data by legacy software can proceed unimpeded, and unaffected, by the presence of per-block metadata.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
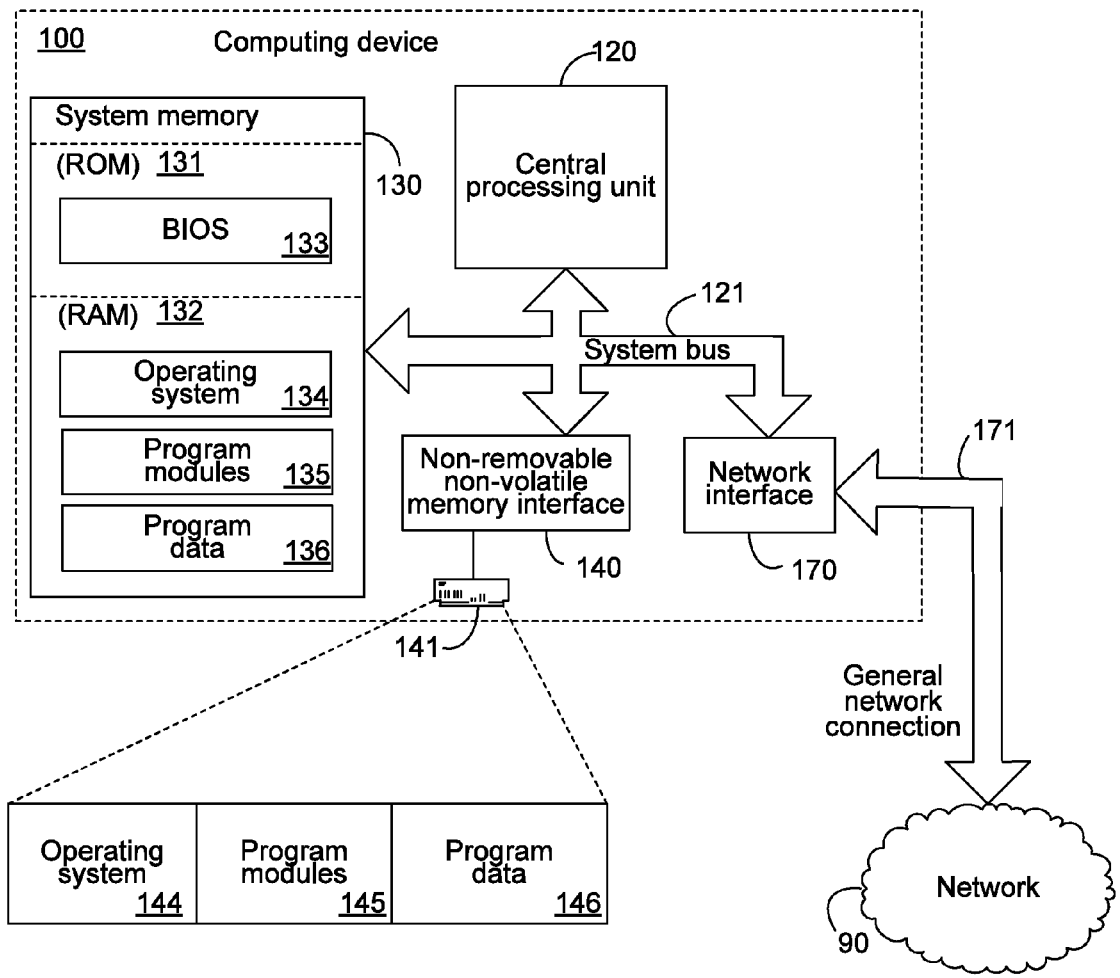
FIG. 1 is a block diagram of an exemplary computing device.

The following description relates to the implementation and utilization of per-block metadata, such as can be implemented using modern storage devices. A protocol can be established by which a storage device and an operating system, or other higher-level software, can agree upon a set of per-block metadata features and attributes that are commonly supported. Subsequently, the operating system, or other higher-level software, can provide per-block metadata to the storage device that either the operating system or higher-level software will themselves use and refer to, or that they will request the storage device to use or reference. Alternatively, the storage device can itself identify and store metadata and it can, itself, utilize such metadata for more efficient processing, or to fulfill requests made by the operating system, or other higher-level software.

The techniques described herein focus on, but are not limited to, solid-state storage devices, such as FLASH drives or other block organized solid-state storage devices. Indeed, while the performance benefits may be reduced, and the implementations may be more resource intensive, none of the below-described elements, attributes, features, or implementations mandates or necessitates the use of solid-state storage devices and each can be implemented, with the above caveats, with any block storage technology. Similarly, while the techniques described herein focus on the interaction between the operating system and the storage device, any higher-level software, including file system utilities, operating system utilities, and any other software application, can likewise perform the functions described below as being performed by the operating system. For ease of reference, the term "file system" will be used to refer to any operating system, utility, or other software application that can make use of per-block metadata in the manner described below.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. By way of example only, FIG. 1 illustrates a solid-state disk drive 141, such as a NAND FLASH disk drive, that reads from or writes to non-removable, nonvolatile solid-state storage media. Other removable/non-removable, volatile/nonvolatile computer storage media that can be used with the exemplary computing device include, but are not limited to, FLASH memory cards, or other solid-state storage devices, including RAM disks, hard drives, magnetic tape cassettes, digital versatile disks, digital video tape and other sequential storage devices. The solid-state disk drive 141 is typically connected to the system bus 121 through a non-removable memory interface such as interface 140.

Figure 2:
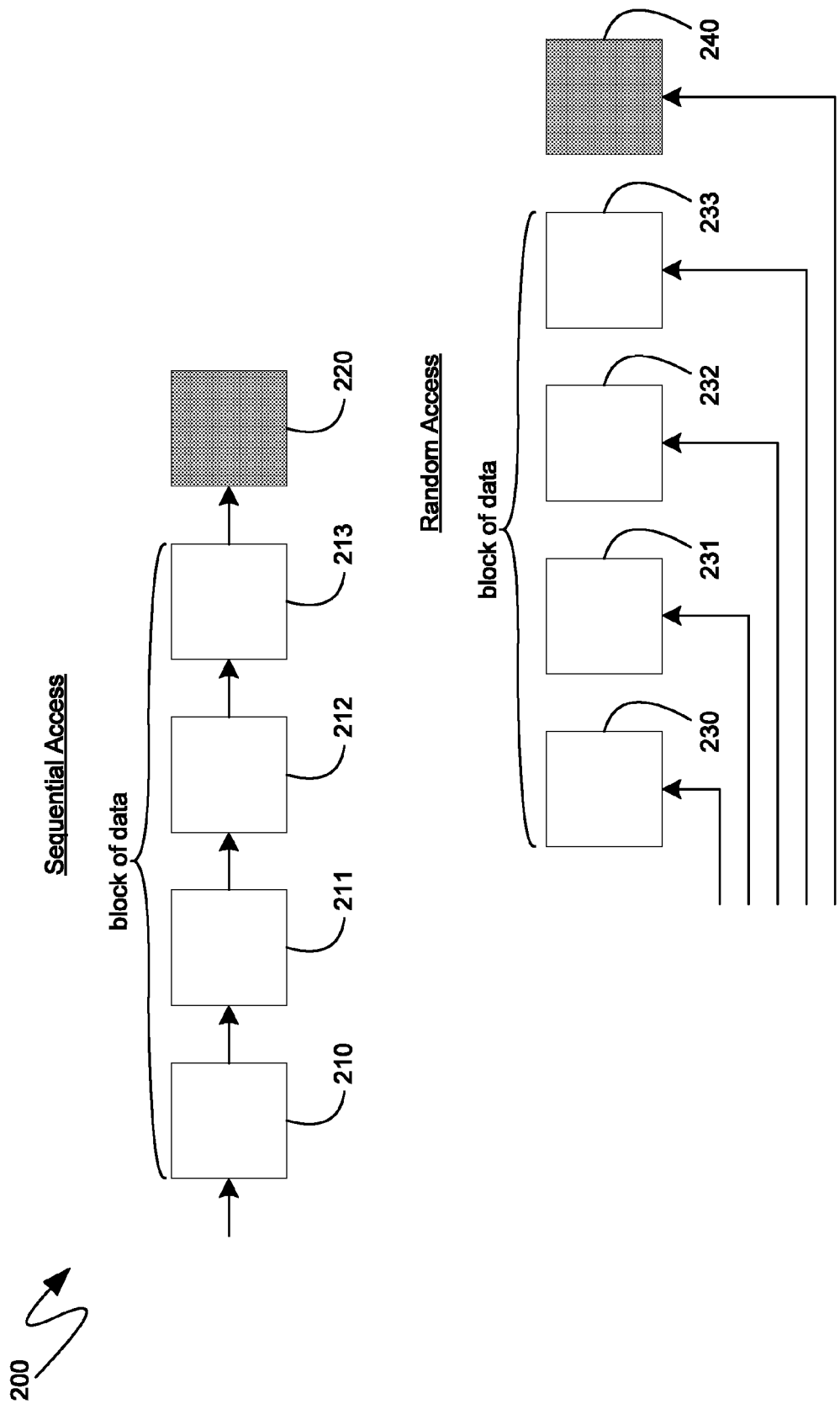
FIG. 2 is a block diagram illustrating sequential and random access.

The drives and their associated computer storage media discussed above and illustrated in FIG. 2, provide storage of computer readable instructions, data structures, program modules and other data for the computing device 100. In FIG. 2, for example, solid-state disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Additionally, the computing device 100 may operate in a networked environment using logical connections to one or more remote computers. For simplicity of illustration, the computing device 100 is shown in FIG. 1 to be connected to a network 90 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Solid-state disk drive 141 can store the data comprising the operating system 144, program modules 145 and program data 146 in a random, as opposed to sequential, manner. Turning to FIG. 2, a simple block diagram 200 is shown illustrating the differences between the random storage and access of data that can be performed by solid-state disk drive 141 and the sequential storage and access of data performed by more traditional magnetic- or optical-based storage media, including magnetic-platter based media, such as the ubiquitous magnetic hard drive. Specifically, in a sequential storage device, as that term is used herein, the data stored in locations 210, 211, 212 and 213 must at least be passed over by a reading and writing apparatus before the data stored in location 220 can be read or written. By contrast, in a random storage device, as that term is used herein, the data stored in location 240, for example, can be read or written directly without the need to physically pass over the locations 230, 231, 232 and 233. Thus, the data stored in any one of the locations 230, 231, 232, 233 or 240 can be accessed with the same efficiency irrespective of the last data location that was accessed.

Of relevance to the descriptions below, the data stored in location 240 can, in one embodiment, represent information about the block of data stored in locations 230, 231, 232 and 233. Such metadata stored in location 240 can, as will be described below, be useful independently of the data stored in locations 230 through 233. For example, a search can be made by reference exclusively to the metadata. In such a case, a random access device, such as solid-state disk drive 141, can provide an efficiency advantage over sequential access devices, because the random access device can directly access metadata locations, such as location 240, without seeking over intermediate data locations, such as locations 230 through 233. Nevertheless, as indicated previously, while sequential storage devices may be less efficient, none of the below-described per-block metadata features or operations is limited to only random access storage devices and, consequently, sequential storage devices can likewise be used to implement the below described embodiments.

In one embodiment, the block of data, comprising the data stored in locations 230 through 233, for example, can be associated with the metadata stored in location 240 such that the block of data stored in locations 230 through 233 need not comprise a discrete file, component or other higher-level software quantization of data, but rather can be merely any relevant block of data as stored by a storage device. In such a case, the metadata stored in location 240 can be a per-block metadata, providing information relevant to the block of data stored in one or more of the locations 230 through 233. As will be described further below, the per-block metadata can comprise information regarding the boundaries of a relevant collection of data, which could indicate other blocks of data that are associated with the current block of data, or it can comprise information regarding access patterns, which can suggest other blocks of data that will likely be accessed concurrently with any access to the current block of data. The per-block metadata can likewise provide information regarding the frequency with which the block of data is accessed or modified, or its importance, such as could be determined by one or more higher-level applications or utilities, or the per-block metadata can comprise information relevant to content searching, such as the nature of the information contained in the associated block of information.

To determine the per-block metadata capabilities of a storage device, such as the solid-state disk drive 141, and a file system, such as would be maintained by the operating system 134 or other programs 135, including utilities and content creation programs, a communicational protocol can be used to enable both the file system and the underlying storage device to exchange information regarding what level of support, if any, each provides for per-block metadata. In one embodiment, such as that illustrated in FIG. 3, a communicational protocol can establish and agreed-upon level of per-block metadata support between a file system 320 and a storage device, or, more specifically, between the file system and the control circuitry and firmware 330 of the storage device.

Figure 3:
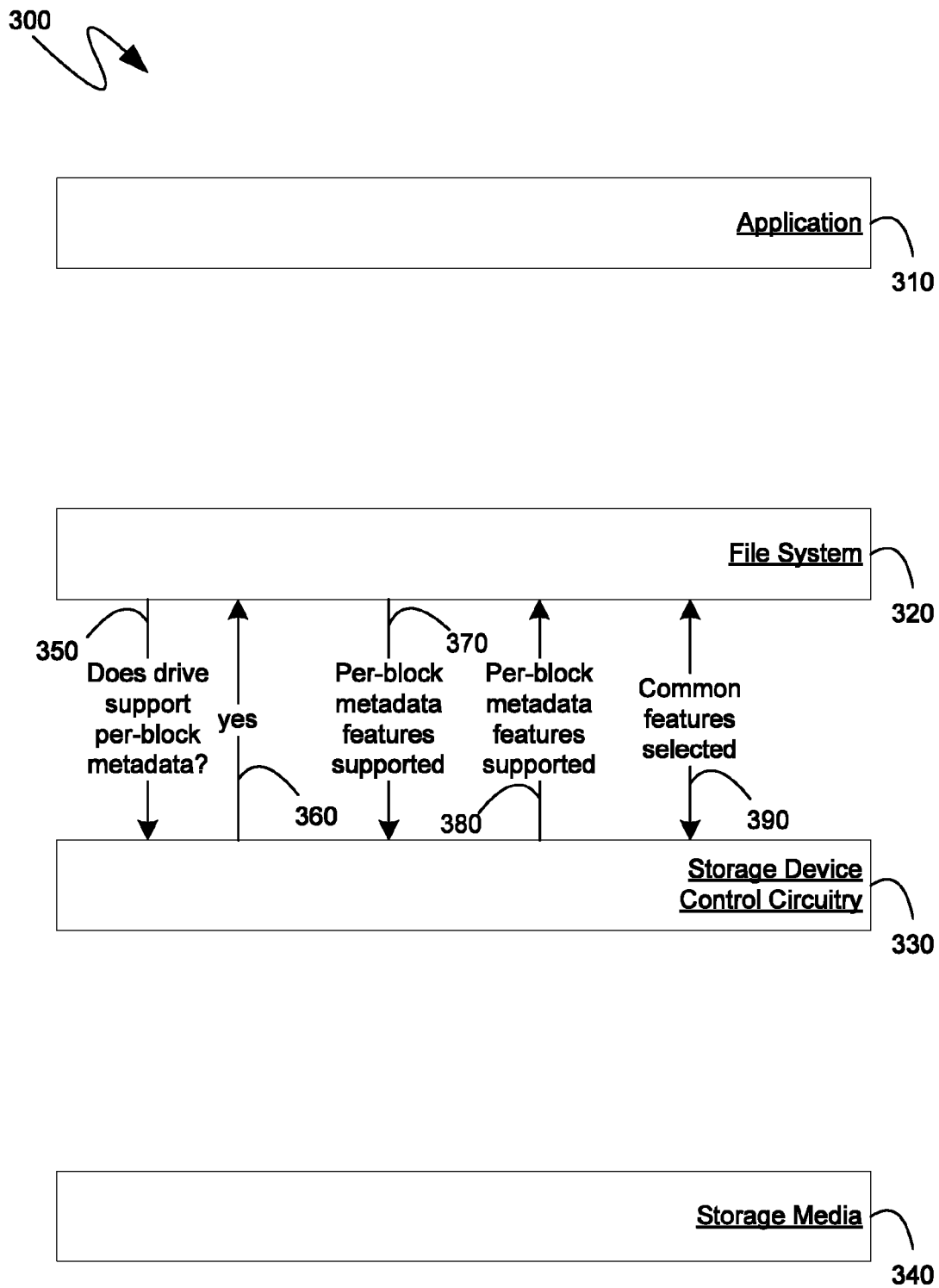
FIG. 3 is a block diagram of an exemplary per-block metadata feature and attribute support handshake.

Block diagram 300 of FIG. 3 illustrates one or more applications 310 that can be supported by the file system 320, which can, as indicated previously, represent aspects of the operating system, utility software applications or any other software. The file system 320, as illustrated, can, in turn, communicate with the control circuitry 330 of the storage device, which can also comprise the physical storage media 340. Communication between the file system 320 and the control circuitry 330 can occur via the communication bus 121, as indicated previously.

Initially, in one embodiment, the file system 320 can transmit a message 350 inquiring whether the storage device supports the storage and utilization of per-block metadata. If the storage device does not provide such support, it can either ignore the message 350 or it can respond accordingly and the file system can discontinue any further attempts to send per-block metadata to the storage device. However, if the storage device does support per-block metadata, it can respond with an affirmative statement 360, which can, in turn, trigger both the storage device and the file system 320 to transmit, to the other, a listing of the attributes and features of per-block metadata supported. Thus, as shown in FIG. 3, in response to receiving the affirmative reply 360, the file system 320 can transmit, via communication 370, the per-block metadata features and attributes it supports. In one embodiment, communication 370 can comprise a feature table listing the supported per-block metadata features and attributes. The storage device control circuitry 330 can, likewise, via communication 380, provide a listing of the per-block metadata features and attributes it supports, which can, again, in one embodiment, take the form of a feature table. In another embodiment, the listing of supported features and attributes provided by communication 380 can have, instead, been provided together with the affirmative reply in communication 360.

The file system 320 can, upon receipt of the supported per-block metadata attributes and features of the storage device, suggest, as the set of attributes and features to be agreed upon and utilized, the overlapping set of attributes and features that was indicated as supported by both communication 370 and communication 380. Alternatively, the storage device control circuitry can, likewise, propose a common, overlapping set of attributes and features. Communication 390, as shown in FIG. 3, comprises this initial proposal, whether sent by the file system 320 or the storage device control circuitry 330, and the subsequent acceptance by the recipient. In an alternative embodiment, communications 390 can comprise multiple rounds, including, for example, counter-proposals for the set of features and attributes to be agreed upon. The flow diagram 400 of FIG. 4 provides one example of such counter-proposal communications.

Figure 4:
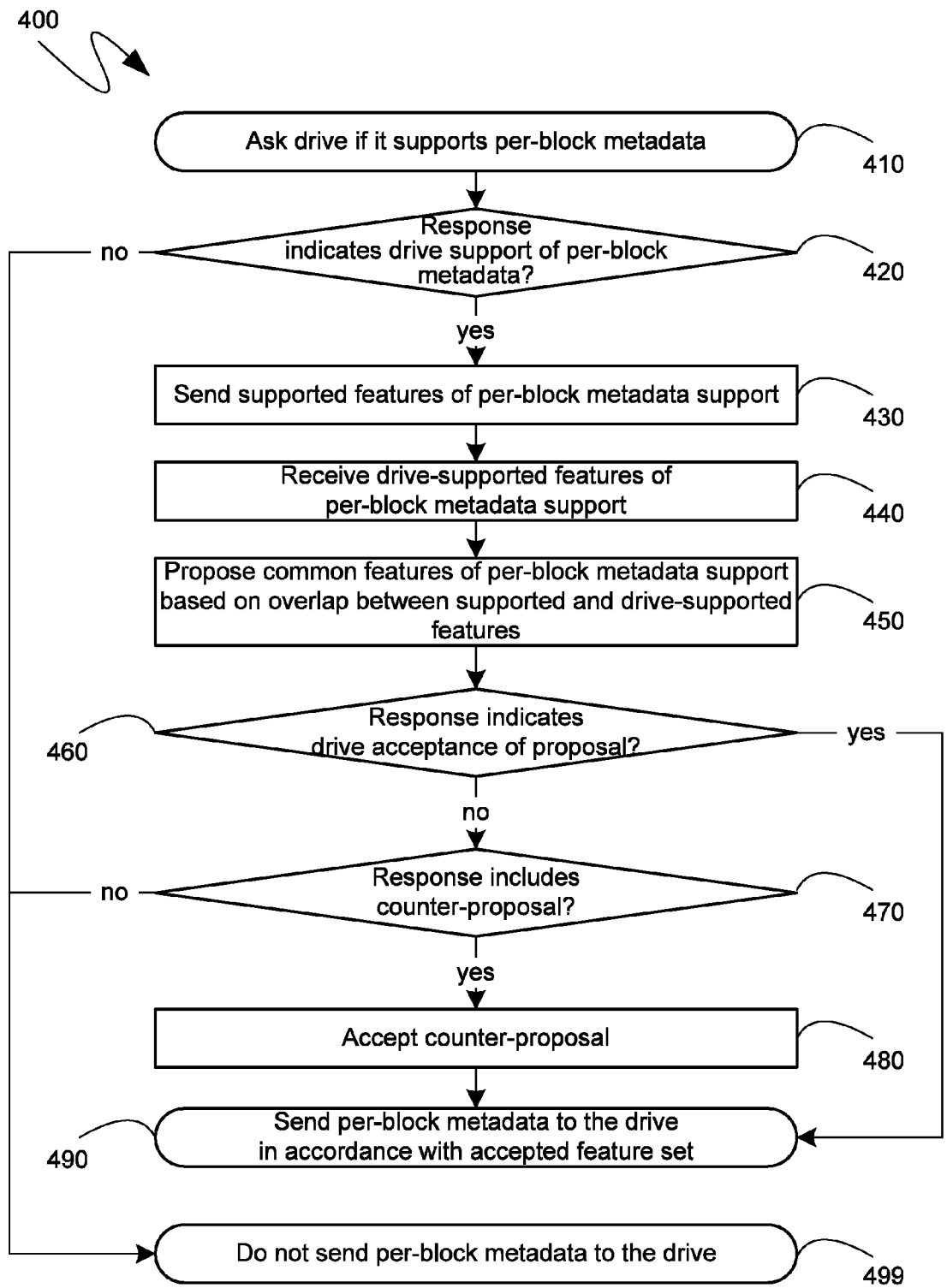
FIG. 4 is an exemplary flow diagram of an exemplary per-block metadata feature and attribute support handshake.

Turning to FIG. 4, the flow diagram 400 comprises steps directed to one or more counter-proposals in addition to steps that would generate some of the above described communications. For example, the initial step 410, wherein a request can be directed to the storage device to determine if it supports per-block metadata, can generate a communication analogous to communication 350, described previously. The steps of the flow diagram 400 proceed to, in part, illustrate the above-described steps. Thus, at step 420 a determination is made whether a response was received from the storage device. If no response was received, or if a response indicating no support of per-block metadata was received, then processing can proceed to step 499, where it is determined to not send any per-block metadata to the storage device.

However, if, at step 420, it is determined that the storage device has responded that it does support per-block metadata, the supported features and attributes of per-block metadata can be communicated to the storage device at step 430, resulting in the transmission of a communication analogous to communication 370, described above. Proximately to step 430, the drive-supported per-block metadata features and attributes can be received at step 440. As indicated previously, if the drive-supported per-block metadata features and attributes were sent as part of communication 360, then step 440 may be performed prior to step 430. Once both parties' per-block metadata feature and attribute support is received, a set of commonly supported features and attributes can be determined at step 450, and can be proposed to the storage device. Step 450 can be one of the communications encompassed by the communications 390 described above.

If, at step 460, a response is received from the storage device indicating agreement upon the proposed features and attributes from step 450, processing can proceed to step 490 and per-block metadata can be sent to the storage device in accordance with the accepted feature and attribute set. However, if at step 460, an acceptance of the proposed feature and attribute set is not received, a check can be made at step 470 to determine if a counter-proposal was received. Such a counter-proposal could have been sent by the storage device as another of the communications 390, described above. If such a counter-proposal was received at step 470, then at step 480, it can be accepted and, as indicated previously, the sending of per-block metadata to the storage device can commence at step 490. If no counter-proposal was received at step 470, then, in one embodiment, a determination can be made to not send any per-block metadata to the storage device, as indicated by step 499.

Figure 5:
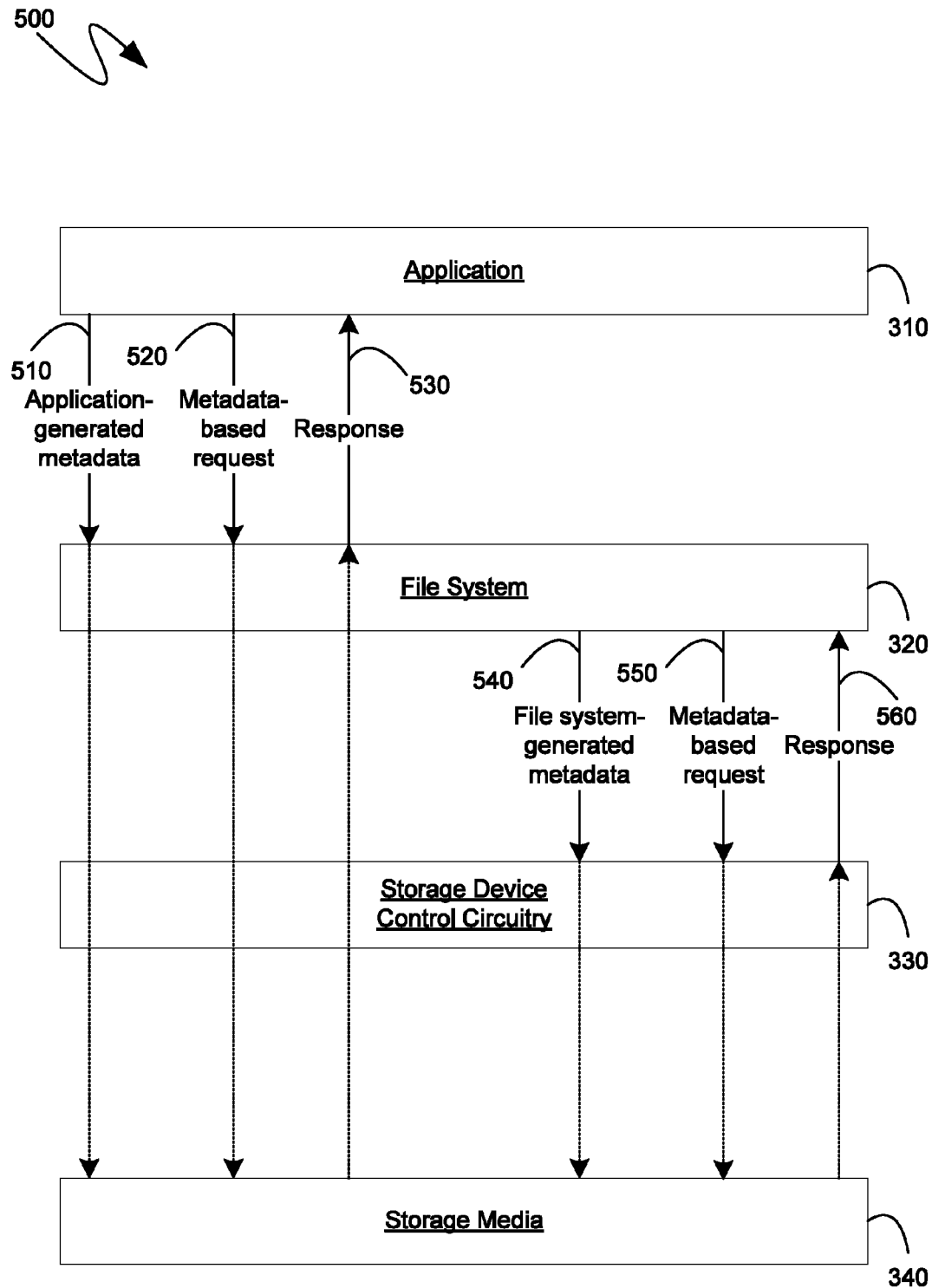
FIG. 5 is a block diagram of an exemplary provision and utilization of per-block metadata.

If agreement on a common set of features and attributes was reached, then file system 320 and higher-level applications 310 can utilize aspects of the per-block metadata to provide benefits. Turning to FIG. 5, a communicational flow diagram 500 is shown, illustrating exemplary communications and utilizations of the per-block metadata capabilities of the storage device. While the communicational flow diagram 500 only illustrates one or more applications 310, the file system 320 and a storage device comprised of storage device control circuitry 330 and storage media 340, additional embodiments contemplate the usage of per-block metadata by any system or component that can source Input/Output (I/O) communications. Such systems and components can include, but are not limited to, the storage stack, memory managers and I/O optimization utilities.

In one embodiment, one or more applications 310, or the file system 320, which, as indicated previously, represents aspects of the operating system, utility software applications or any other software, can provide per-block metadata to the storage device such that the provided per-block metadata will be subsequently used by the providing software itself. In an alternative embodiment, the applications 310, or the file system 320 can provide per-block metadata, or information that can be used to generate relevant per-block metadata such that the storage device, and not the providing software, will subsequently use it. In a still further alternative, a hybrid of the prior two embodiments can be utilized, such that the per-block metadata can be generated by and used by the storage device, applications 310 and file system 320 interchangeably.

The communicational flow diagram 500 of FIG. 5 illustrates the former embodiment, whereby the providing software intends to itself utilize the per-block metadata it provided to the storage device for its own purposes. In one embodiment, applications, such as application 310, or the operating system or other utilities, such as the file system 320, can directly transmit their own application-generated per-block metadata or file system-generated per-block metadata. For example, as shown in FIG. 5, application-generated per-block metadata 510 can be sourced from the application 310 for storage on the storage media 340.

Because each individual block that can have metadata associated with it can be merely a part of a single file, application 310 can be the type of application that has an understanding of the underlying storage hardware such that it can quantize data into sub-file sized quanta, such as blocks, in accordance with the storage hardware being used. Such applications can include groupware and database applications, as well as other types of applications and utilities. Alternatively, the application 310 can generate file-level metadata which can be subsequently translated into block-level metadata by the file system 320. Application 310 in this case will issue requests, to the file system 320, on file byte ranges with the same or similar metadata.

If the application 310 can quantize data into sub-file sized blocks, it can also provide application-generated per-block metadata 510 for one or more such blocks. In one embodiment, such application-generated metadata 510 can be communicated through the operating system, represented in flow diagram 500 by the file system 320, and through the storage device control circuitry 330, to be ultimately stored on the storage media 340.

Once stored, the application-generated per-block metadata can be used either by the application 310, or by the storage device, either on behalf of the application, or on its own behalf. The communicational flow diagram 500 of FIG. 5 illustrates the former embodiment, with the application 310 making a metadata-based request 520, which is ultimately transmitted to the storage device. Subsequently, a response 530 is provided back to the application 310. As an example, the application 310 can provide application-generated metadata 510 that indicates a sequential I/O pattern. Such metadata can provide, with each block, an identification of one or more other bocks that are likely to be requested if that block was requested. The application 310 could use such information to pre-load the remaining blocks when an action, such as a user action, causes the application to request a block that has such a sequential I/O pattern stored as part of the metadata associated with that block. Thus, when a block is read by the application 310, the application can likewise receive the per-block metadata it provided previously and can, based on the sequential I/O pattern stored in the per-block metadata, determine that additional blocks are likely to be subsequently needed. As a result the application can make a metadata-based request 520 for those other blocks and can receive those other blocks from the storage device as response 530. Alternatively, the metadata-based request 520 could be issued by the file system 320, and the response 530 could be returned to the file system to read and interpret the per-block metadata initially supplied by the application 310, via communication 510. In such a case, the application 310 and the file system 320 can have previously agreed on the format of the metadata.

Although at a lower level, the file system 320 can, likewise, either provide its own per-block metadata, or it can provide information that can, in turn, be used to generate per-block metadata by downstream processes. The communicational flow 500 shown in FIG. 5 illustrates the former, with the file system 320 providing file system-generated metadata 540 to the storage device. For example, the file system 320 can provide file system-generated per-block metadata 540 that indicates the frequency with which the associated block is accessed by the file system 320 or by processes being supported by the file system 320, such as application 310.

Such information can then be used, either by the file system 320, or by the storage device, either on behalf of the file system, or on its own behalf. Illustrating the former embodiment, the communicational flow diagram 500 shows the file system 320 making a metadata-based request 550, which is ultimately transmitted to the storage device. Subsequently, a response 560 is provided back to the file system 320. As an example, the file system 320 can seek to index, for searching purposes, the data stored on the storage media 430. To optimize indexing, the file system 320 can first index those blocks that are most often accessed, as they are likely to have the most relevant results. Thus, the file system 320 can request only the data from the per-block metadata from the storage device and can determine, based on that metadata, which blocks to request for indexing purposes. Thus, the metadata-based request 550 can be a request for the per-block metadata for some or all of the blocks stored on the storage media 340, and the associated response 560 can be the provision of the requested per-block metadata. As indicated previously, because, in one embodiment, the storage media can be a random access storage media, the request for only the data from the per-block metadata can be fulfilled by the storage device in an efficient manner, since the storage device would be capable of directly reading only the per-block metadata and would not incur any additional time in seeking between one segment of per-block metadata and another. The per-block metadata would, as explained above, be stored in a metadata namespace that would be separately addressable from the data namespace. Furthermore, the returned elements of metadata could be coalesced into a large transfers, thereby maximally utilizing bandwidth of the underlying communication channel.

Figure 6:
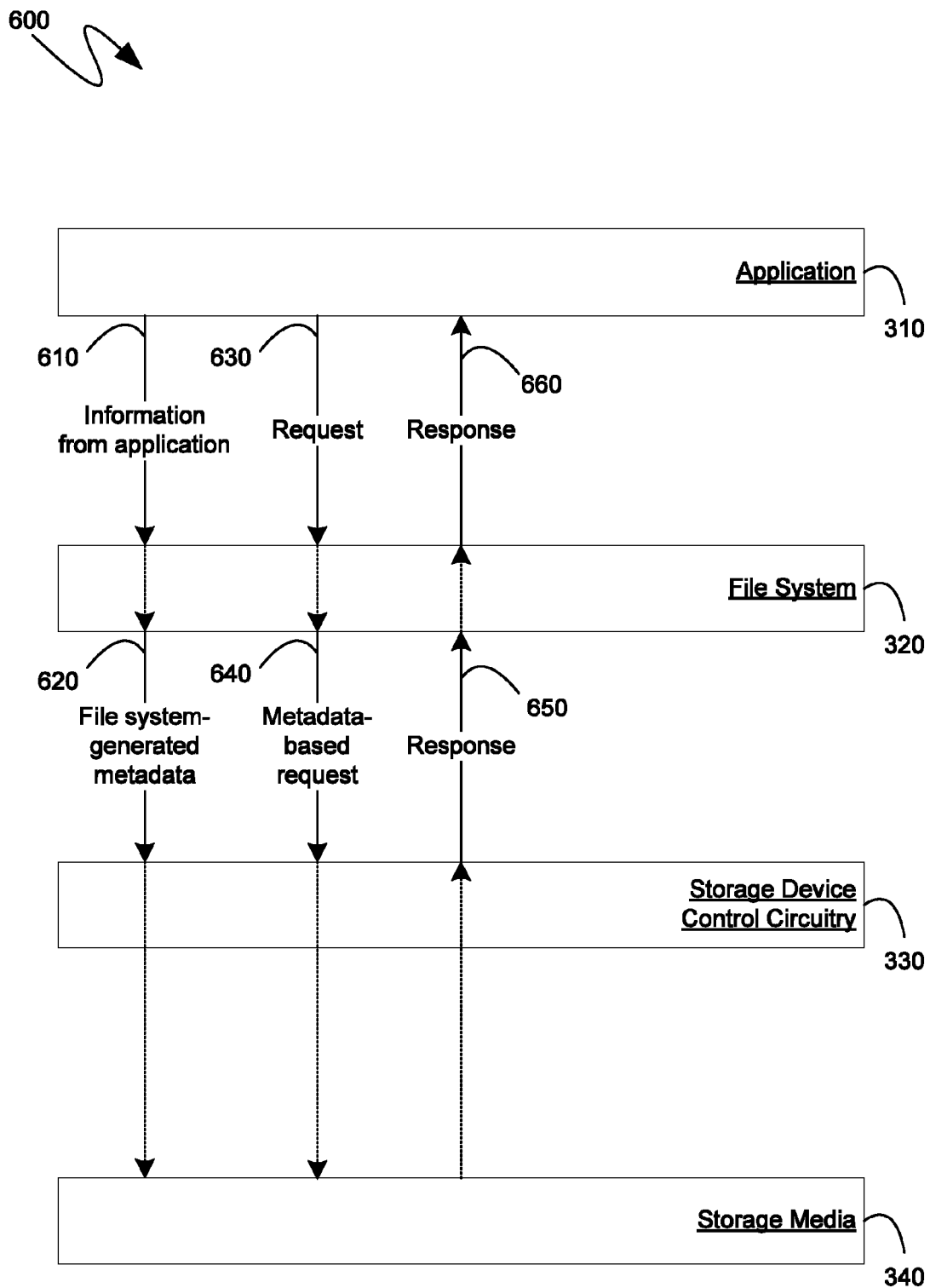
FIG. 6 is a block diagram of another exemplary provision and utilization of per-block metadata.

In an alternative embodiment, one or more applications 310 can indirectly utilize per-block metadata by, for example, providing information to lower level processes which can then, in turn, generate per-block metadata. Turning to FIG. 6, communicational flow diagram 600 illustrates the application 310 merely providing information 610, but not necessarily per-block metadata information, to the file system 320. The file system 320 can then, from the application-provided information 610, generate per-block metadata 620 that can then be provided to the storage device and stored on the storage media 340. In such a manner, data from the application 310 can still be tagged with per-block metadata without requiring the application 310 to, itself, provide support for such information. For example, applications that are designed to deal with data quantized into discrete files may not be able to provide application-generated metadata 510 on a per-block basis since, as indicated previously, the information from a single file can be stored on the storage media 340 across multiple blocks of data, each of which can have unique metadata associated with it. In such cases, the file system's ability to generate appropriate per-block metadata 620 from information 610 provided by the application 310 can be utilized.

As an illustration, the application 310 can provide information 610 to the file system 320 that the data being stored is designated to have a "high" priority. Such a designation can originate from a number of sources, such as the user themselves, who is often provided with the ability to classify the category of information within specific applications. The file system 320 can then translate information 610 into file system-generated per-block metadata 620 by providing, with each block of data being stored, metadata that indicates that that block is considered part of a file that has been assigned a "high" priority. As before, the information 610, provided by the application 310, can be utilized by the application 310 itself, the file system 320, or by the storage device. Communicational flow diagram 600 illustrates the former, with the application 310 providing a request 630 to the file system 320, such as, for example, a request to provide the application with the data of only those files that the application had previously indicated were "high" priority. The file system 320, in turn, can seek to satisfy that request by utilizing the per-block metadata capabilities of the storage device. Thus, as shown in FIG. 6, the file system 320 can craft an appropriate metadata-based request 640 to the storage device in response to receiving request 630 from the application 310. For example, metadata-based request 640 could request that the storage device provide, to the file system 320, only the data from those blocks that are associated with per-block metadata indicating a "high" priority. That data could be received from the storage device as response 650, which the file system 320 can, in turn, reassemble into files and provide to the application 310 as response 660. In such a manner, the application 310 can indirectly utilize the per-block metadata functionality of the storage device to provide, for example, faster access to specified files. The above described indirect utilization of per-block metadata is not limited to higher level applications, as any system could be so extended using appropriate lower-level functionality, such as that provided in the above example by the file system 320.

Figure 7:
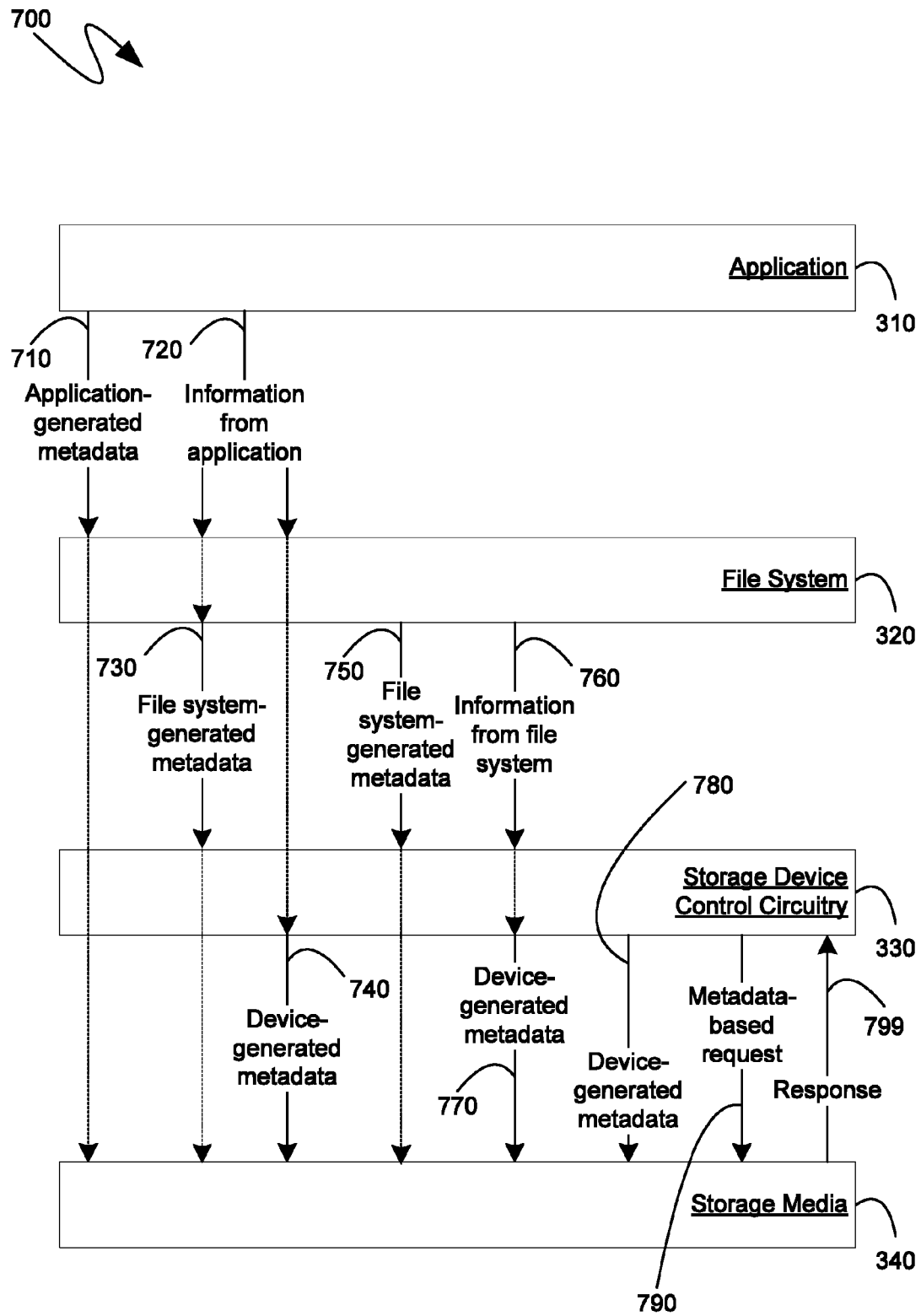
FIG. 7 is a block diagram of a still other exemplary provision and utilization of per-block metadata.

As indicated previously, in an alternative embodiment, rather than directly, or indirectly, utilizing per-block metadata, one or more applications 310, or the file system 320 can instead request that the storage device itself utilize the per-block metadata. Turning to FIG. 7, a communicational flow diagram 700 is shown illustrating the usage, by the storage device itself, of per-block metadata provided, either directly or indirectly, by one or more applications 310 or by the file system 320. As described above, per-block metadata can be directly provided by the application 310, such as through communication 710. Alternatively, the application 310 can indirectly provide per-block metadata though application-provided information 720, which can either be used by the file system 320 to generate per-block metadata 730, as described in detail above, or it can be used by the storage device itself, such as by the storage device control circuitry 330, to generate per-block metadata 740. Device-generated per-block metadata 740 can, in one embodiment, be analogous to the above-described file system-generated metadata 730. Thus, for example, if the information 720, from the application 310, indicated that the file had been designed as a "high" priority file, then the storage device control circuitry 330 could cause the storage of the data of the file onto the storage media 340 with associated per-block metadata 740 indicating the data had been marked as having a "high" priority.

The file system 320 can likewise source, either directly or indirectly, per-block metadata. As indicated previously, the file system 320 can provide file system generated metadata 750 to the storage device. Alternatively, the file system 320 can merely provide information 760 from which the storage device control circuitry can generate appropriate per-block metadata 770. For example, the storage device may be able to perform functions that that the file system 320 can request without understanding the required per-block metadata. One such function can be the automatic deletion of unnecessary, or temporary, files. Thus, the file system 320 could utilize the storage device's ability to automatically delete files by providing information 760 that indicates the associated data should be automatically deleted after a specified period of time. The storage device, through its control circuitry 330, could utilize per-block metadata to associate, with the relevant blocks of data, per-block metadata that indicates that the associated blocks should be deleted within the specified period of time.

The per-block metadata provided by one or more applications 310, or the file system 320, either directly or indirectly, can be utilized by the storage device itself, either due to a specific request from the one or more applications 310, or the file system 320, or as a result of the storage device's own internal processing. In either case, as shown in communicational flow diagram 700, elements of the storage device itself, such as the storage device control circuitry 330, can initiate metadata-based requests 790 and can receive an appropriate response 799 in the form of data or other information from the storage media 340. For example, if the file system 320 had provided data to the storage device that only needed to be retained for a specified period of time, the storage device itself can monitor such deadlines and act upon them. Thus, the storage device control circuitry 330, for example, could perform a metadata-based request 790 in the form of a search, through the per-block metadata, for all of the blocks that could be deleted and no longer needed to be retained. Again, because of an independently addressable metadata namespace, such a search could be performed in a very efficient manner. The resulting information 799 would enable the storage device to determine which blocks it could erase and which needed to be retained further.

Alternatively, the storage device could perform metadata-based actions on its own and without any explicit request from higher level applications 310 or the file system 320. For example, the storage device could attempt to provide a greater amount of storage space by automatically compressing data that is not used often. Such usage information could, in part, be informed by the categorization assigned by, for example, the application 310. Thus, the storage device control circuitry 330 could perform a metadata-based request 790 in the form of a search, through the per-block metadata, for all of the blocks that are not marked with a "high" priority and could use the resulting information 799 to identify one or more blocks of data that could be compressed to save space.

The storage device can, likewise, generate its own per-block metadata, without necessarily relying on information or metadata from higher-level software, such as one or more applications 310, or the file system 320. Returning to the above described example, the storage device can attempt to conserve storage space by compressing data that is not often accessed, but the monitoring of the access of data can be performed through appropriate per-block metadata 780 that is generated by the storage device itself. For example, each time a block is accessed, the storage device control circuitry 330 can generate per-block metadata 780 comprising a time stamp of that access. Subsequently, when the storage device attempts to identify blocks of data that can be compressed, the storage device control circuitry can simply perform a search 790 through the per-block metadata, identifying metadata that indicates that the associated block has not been accessed within a pre-determined amount of time. Such information 799 can, then, enable the storage device control circuitry 330 to identify the blocks of data that are to be compressed.

The above examples illustrate some examples of the information that can be retained by the per-block metadata. As indicated, per-block metadata can be, either directly or indirectly, provided by and utilized by higher-level software, such as application 310 and file system 320, or it can be provided by higher-level software and utilized by the storage device itself or, alternatively, it can be both provided by, and utilized by, the storage device. Examples of the former type of per-block metadata include metadata that can define the boundaries of "objects" such that the request for one block of such an "object" will likely result in requests for at least some of the other blocks of that "object." Similarly, the per-block metadata can comprise sequential I/O patterns indicating the next block that is likely to be requested given the immediately preceding requested block.

In another embodiment, the per-block metadata can comprise information that enables an application 310, file system 320, or other higher-level software to provide end-to-end data protection. For example, the application 310 or the file system 320 can attach, as metadata, to each block of data written to the storage media 340, a cryptographic hash, or similar security identifier, of the block of data. Such per-block metadata can be provided back to the file system 320, or application 310, to enable them to verify the integrity of the data.

Examples of per-block metadata that can be provided, either directly or indirectly, by higher-level software, but then utilized by the storage device, either at the request of the higher-level software, or as part of the storage device's own mechanisms, include per-block metadata that indicates an importance or priority of the data of the associated block. As indicated previously, such per-block metadata can be sourced by higher-level software, but can then be used by the storage device for various purposes, such as compression. Another example of such metadata can be information specifying the longevity or temporal nature of specific data that one or more higher-level applications do not need retained indefinitely. As also indicated previously, such per-block metadata can be referenced by the storage device to identify data blocks that are to be discarded or otherwise marked as useable space.

Examples of the latter type of per-block metadata, that can be both generated and used by the storage device itself, include the aforementioned frequency of access metadata that can be used by the storage device to identify data that can, for example, be compressed, or moved into slower storage, including, for example, being written to another, less efficient, storage medium. Similarly, the storage device itself can generate per-block metadata that can enable it to mark temporary files for deletion after a predefined period of time and can then enable it to use such per-block metadata to identify data that no longer needs to be retained. A self-indexing storage device can also, such as during idle times, scan blocks of data and add per-block metadata that can enable more efficient searches.

In one embodiment, per-block metadata can be read and written together with the associated data blocks. In such a case, the storage device can access both addresses within the data namespace and the corresponding addresses in the metadata namespace. However, if the higher-level software indicates to the storage device that it cannot understand per-block metadata, the storage device can access only the data namespace and, as such, can not include per-block metadata when communicating such read and write information. A safe mode can, thereby, exist that enables the storage device to be utilized with legacy operating systems and other higher-level software.

If a handshake, such as that described above, informs the storage device that the higher-level software can understand and utilize per-block metadata, then the per-block metadata can be provided in an agreed-upon manner, together with the associated data blocks. For example, the per-block metadata could be provided immediately preceding or anteceding the associated data, separated by an agreed-upon separator. However, to avoid mandating the reading or writing of data only to be able to access per-block metadata, an alternative embodiment contemplates variants of traditional read and write commands that can be directed only to one or more per-block metadata segments. Such commands can occur out of band from traditional read and write commands and can, in essence, enable higher-level software equivalent access to per-block metadata as would be available to mechanisms internal to the storage device itself.

As can be seen from the above descriptions, mechanisms for storing, communicating and utilizing per-block metadata have been provided. In view of the many possible variations of the subject matter described herein, we claim as our invention all such embodiments as may come within the scope of the following claims and equivalents thereto.

We claim:

1. One or more computer-readable storage media comprising computer-executable instructions for utilizing per-block metadata, the computer-executable instructions directed to steps comprising:
   providing, to a storage device, a first quantity of data that will be stored by the storage device into one or more blocks of data, each block of data representing a quantum of data as it is obtainable from the storage device;
   providing, to the storage device, information about the first quantity of data that is used to generate per-block metadata associated with at least some of the one or more blocks of data, the per-block metadata comprising at least one of: a creation date, a last modified date, an identification of other blocks to pre-cache, an identification of other blocks that are part of a same object, a frequency of access, an access pattern, a priority level and a deletion time, with each per-block metadata being associated with only one block of data and each per-block metadata being able to be acted upon independently of another per-block metadata; and
   transmitting a request to a control circuitry of the storage device, requesting that the control circuitry of the storage device perform an operation with respect to at least some of the first quantity of data based on the associated per-block metadata.

2. The computer-readable storage media of claim 1, wherein the requested operation comprises a request for the storage device to compress data stored in blocks of data based on the frequency of access as indicated by per-block metadata.

3. The computer-readable storage media of claim 1, wherein the requested operation comprises a request for the storage device to pre-cache data from blocks of data whose associated per-block metadata identifies them as part of the same object.

4. The computer-readable storage media of claim 1 comprising further computer-executable instructions for providing, to the storage device, revised per-block metadata out of band with respect to the providing the first quantity of data.

5. The computer-readable storage media of claim 1 comprising further computer-executable instructions for:
   querying the storage device as to the storage device's support for per-block metadata;
   receiving one or more responses from the storage device comprising an indication of support for per-block metadata and a feature table of a second set of supported features associated with the per-block metadata;
   selecting one or more features that are in both the first set of supported features and the second set of supported features;
   proposing the selected one or more features to the storage device; and receiving an agreement to the proposed one or more features from the storage device.

6. The computer-readable storage media of claim 1 comprising further computer-executable instructions for: receiving, from application programs or a file system, the first quantity of data and the information about the first quantity of data, the received information about the first quantity of data comprising file-level metadata; and generating the per-block metadata associated with the at least some of the one or more blocks of data, the generated per-block metadata comprising block-level metadata; wherein the providing the information about the first quantity of data to the storage device comprises providing the per-block metadata associated with the at least some of the one or more blocks of data to the storage device.

7. A storage device for storing a quantity of digital data, the storage device comprising;

one or more computer-readable storage media comprising multiple storage locations, the multiple storage locations divided into blocks, with each block comprising one or more of the multiple storage locations, and at least some of the blocks having associated with them additional ones of the multiple storage locations for storing per-block metadata comprising information about data stored in a block associated with the per-block metadata, the per-block metadata comprising at least one of: a creation date, a last modified date, an identification of other blocks to pre-cache, an identification of other blocks that are part of a same object, a frequency of access, an access pattern, a priority level and a deletion time, with each per-block metadata being associated with only one block of data; and control circuitry for: generating information to be stored as per-block metadata; receiving, from external to the control circuitry a request associated with at least some of the generated information stored as per-block metadata; and responding to the request with reference to at least some of the generated information stored as per-block metadata.

8. The storage device of claim 7, wherein the control circuitry further comprises control circuitry for utilizing the per-block metadata to compress data stored in blocks of data based on the frequency of access as indicated by per-block metadata.

9. The storage device of claim 7, wherein the control circuitry further comprises control circuitry for performing steps comprising:

receiving a query as to the computer-readable storage media's support for per-block metadata;

transmitting one or more responses comprising an indication of support for per-block metadata and a feature table of a set of supported features associated with the per-block metadata;

receiving a proposed set of features comprising some or all of the supported features; and transmitting an agreement to the proposed set of features.

10. The storage device of claim 7, wherein the multiple storage locations are accessed using random access mechanisms.

11. One or more computer-readable storage media comprising computer-executable instructions for utilizing per-block metadata, the computer-executable instructions comprising support for a first set of supported features associated with the per-block metadata, the computer-executable instructions directed to steps comprising:

querying a storage device as to the storage device's support for per-block metadata;

receiving one or more responses from the storage device comprising an indication of support for per-block metadata and a feature table of a second set of supported features associated with the per-block metadata;

selecting one or more features that are in both the first set of supported features and the second set of supported features;

proposing the selected one or more features to the storage device;

receiving an agreement to the proposed one or more features from the storage device, providing, to the storage device, a first quantity of data that will be stored by storage device into one or more blocks of data, each block of data representing a quantum of data as it is obtainable from the storage device; an transmitting a request to a control circuitry of the storage device, requesting that the control circuitry of the storage device perform an operation with respect to at least some of the first quantity of data based on associated per-block metadata generate by the storage device, the associated per-block metadata each being associated with only one block of data and each per-block metadata being able to be acted upon independently of another per-block metadata.

12. The computer-readable storage media of claim 11 comprising further computer-executable instructions for: receiving a counter-proposal comprising only some of the proposed one or more features and transmitting an agreement to the counter-proposal to the storage device.

13. The computer-readable storage media of claim 11, wherein the proposed one or more features comprise an identification of access patterns using the per-block metadata.

14. The computer-readable storage media of claim 11, wherein the proposed one or more features comprising identification of data to be deleted after a predetermined time using the per-block metadata.

15. The computer-readable storage media of claim 11, wherein the proposed one or more features comprising indication of a frequency of access using the per- block metadata.

16. The computer-readable storage media of claim 1, wherein the per-block metadata is stored in a metadata namespace that is separately and independently addressable from a data namespace in which the one or more blocks of data are stored.

17. The storage device of claim 7, wherein the control circuitry further comprises control circuitry for storing the per-block metadata in a metadata namespace that is separately and independently addressable from a data namespace in which the blocks of data are stored.

18. The storage device of claim 7, wherein the control circuitry further comprises control circuitry for utilizing the per-block metadata to pre-cache data from blocks of data whose associated per-block metadata identifies them as part of the same object.

19. A computing device comprising:

a first set of one or more computer-readable storage media comprising computer-executable instructions directed to steps comprising:

providing, to a storage device, a first quantity of data and information about the first quantity of data that is used to generate per-block metadata; and transmitting a request to the control circuitry of the storage device requesting that the control circuitry of the storage device perform an operation with respect to at least some of the first quantity of data based on associated per-block metadata; and a storage device comprising:

a second set of one or more computer-readable storage media comprising multiple storage locations, the multiple storage locations divided into blocks, with each block comprising one or more of the multiple storage locations, and at least some of the blocks having associated with them additional ones of the multiple storage locations for storing per-block metadata comprising information about data stored in a block associated with the per-block metadata, the per-block metadata comprising at least one of: a creation date, a last modified date, an identification of other blocks to pre-cache, an identification of other blocks that are part of a same object, a frequency of access, an access pattern, a priority level and a deletion time, with each per-block metadata being associated with only one block of data; and control circuitry for: generating information to be stored as the per-block metadata; receiving the request; and responding to the request with reference to at least some of the generated information stored as the per-block metadata.

20. The computing device of claim 10, wherein the first set of computer-readable storage media comprises further computer-executable instructions for:

querying the storage device as to the storage device's support for per-block metadata;

receiving one or more responses from the storage device comprising an indication of support for per-block metadata and a feature table of a second set of supported features associated with the per-block metadata;

selecting one or more features that are in both the first set of supported features and the second set of supported features;

proposing the selected one or more features to the storage device; and receiving an agreement to the proposed one or more features from the storage device.

21. The computing device of claim 19, wherein the first set of computer-readable storage media comprises further computer-executable instructions for: receiving, from application programs or a file system, the first quantity of data and the information about the first quantity of data, the received information about the first quantity of data comprising file-level metadata; and generating the per-block metadata; wherein the providing the information about the first quantity of data to the storage device comprises providing the generated per-block metadata.

* * * * *

UNITED STATES PATENT AND TRADEMARK OFFICE
CERTIFICATE OF CORRECTION

PATENT NO. : 8,214,343 B2
APPLICATION NO. : 12/050952
DATED : July 3, 2012
INVENTOR(S) : Sadovsky et al.

It is certified that error appears in the above-identified patent and that said Letters Patent is hereby corrected as shown below:

IN THE CLAIMS:

In column 15, line 19, in Claim 7, after "comprising" delete ";" and insert -- : --, therefor.

In column 15, line 37, in Claim 7, after "circuitry" insert -- , --.

In column 16, line 14, in Claim 11, delete "device," and insert -- device; --, therefor.

In column 16, line 16, in Claim 11, after "by" insert -- the --.

In column 16, line 18, in Claim 11, delete "an" and insert -- and --, therefor.

In column 16, line 23, in Claim 11, delete "generate" and insert -- generated --, therefor.

In column 16, line 43, in Claim 15, delete "per- block" and insert -- per-block --, therefor.

In column 17, line 24, in Claim 20, delete "10," and insert -- 19, --, therefor.

Signed and Sealed this
Ninth Day of October, 2012

David J. Kappos
*Director of the United States Patent and Trademark Office*